US012584563B2

(12) United States Patent
    Kowol

(10) Patent No.:   US 12,584,563 B2
(45) Date of Patent:       Mar. 24, 2026

(54) SANITARY VALVE

(71) Applicant: Neoperl GmbH, Müllheim (DE)

(72) Inventor: Jacek Kowol, Gundelfingen (DE)

(73) Assignee: NEOPERL GMBH, Mullheim (DE)

( * ) Notice: Subject to any disclaimer, the term of this patent is extended or adjusted under 35 U.S.C. 154(b) by 226 days.

(21) Appl. No.: 18/276,282

(22) PCT Filed: Feb. 14, 2022

(86) PCT No.: PCT/EP2022/053483
    § 371 (c)(1),
    (2) Date: Aug. 8, 2023

(87) PCT Pub. No.: WO2022/175196
    PCT Pub. Date: Aug. 25, 2022

(65) Prior Publication Data
    US 2024/0125404 A1      Apr. 18, 2024

(30) Foreign Application Priority Data
    Feb. 19, 2021    (DE) ..................... 20 2021 100 840.7

(51) Int. Cl.
    *F16K 27/02*          (2006.01)
    *F16K 11/00*          (2006.01)
    (Continued)

(52) U.S. Cl.
    CPC ........ *F16K 27/0236* (2013.01); *F16K 11/074* (2013.01); *F16K 19/006* (2013.01); (Continued)

(58) Field of Classification Search
    CPC ............. F16K 27/0236; F16K 31/3855; F16K 31/52491; F16K 31/44
    See application file for complete search history.

(56) References Cited

U.S. PATENT DOCUMENTS 4,203,464 A * 5/1980 Farrell .............. F16K 31/52491
                                                                137/454.2
4,819,682 A * 4/1989 Van Marcke ......... F16K 31/404
                                                                251/47
(Continued)

FOREIGN PATENT DOCUMENTS

CN          104948777          9/2015
DE            2542663          3/1977
(Continued)

*Primary Examiner* — Craig M Schneider
*Assistant Examiner* — Christopher D Ballman
(74) *Attorney, Agent, or Firm* — Volpe Koenig

(57) ABSTRACT

A sanitary valve having a main valve with a diaphragm movable between closed and open positions. The main valve is in an inner housing rotatably mounted in an outer housing. The inner housing has a first valve opening connected to a first valve opening in the outer housing to form a valve outlet. The inner housing has a second valve opening arranged on the outside relative to the valve outlet and is paired with a second valve opening in the outer housing forming a valve inlet. Paired second valve openings are brought into congruence by a relative twisting of the inner and outer housings with the valve inlet being variable. The inner housing has a pot-base inside from which a valve connector protrudes which connects the inner part first valve opening forming the valve outlet to the valve seat formed by the free sleeve end region of the valve connector.

17 Claims, 14 Drawing Sheets

(51) Int. Cl.
    *F16K 11/074*         (2006.01)
    *F16K 31/385*         (2006.01)
    *F16K 31/44*           (2006.01)
    *F16K 31/524*         (2006.01)

(52) U.S. Cl.
    CPC .......... *F16K 31/3855* (2013.01); *F16K 31/44*
    (2013.01); *F16K 31/52491* (2013.01)

(56)                 References Cited

U.S. PATENT DOCUMENTS

| | | | | |
|---|---|---|---|---|
| 5,169,117 | A * | 12/1992 | Huang | F16K 31/086 |
| | | | | 251/38 |
| 5,706,859 | A * | 1/1998 | Backlund | F16K 11/022 |
| | | | | 137/885 |
| 5,758,863 | A * | 6/1998 | Buffet | F16K 31/3855 |
| | | | | 251/28 |
| 5,915,665 | A * | 6/1999 | Paese | F16K 31/402 |
| | | | | 251/30.04 |
| 6,082,703 | A * | 7/2000 | Fava | F16K 3/08 |
| | | | | 251/30.02 |
| 6,607,174 | B2 * | 8/2003 | Weber | F16K 31/404 |
| | | | | 251/30.03 |
| 6,742,542 | B1 * | 6/2004 | Dierks | F16K 31/602 |
| | | | | 280/736 |
| 7,080,817 | B2 * | 7/2006 | Stern | F16K 31/404 |
| | | | | 251/129.17 |
| 7,296,593 | B2 * | 11/2007 | Matsui | F16K 21/12 |
| | | | | 251/38 |
| 9,297,475 | B2 * | 3/2016 | Nobili | F16K 11/0743 |
| 9,671,038 | B2 * | 6/2017 | Schneidewend | F16K 27/0236 |
| 10,208,872 | B2 * | 2/2019 | Bian | F16K 31/3855 |
| 10,337,641 | B2 * | 7/2019 | Ye | F16K 31/145 |
| 10,487,486 | B2 * | 11/2019 | Funari | E03D 5/105 |
| 10,544,876 | B2 * | 1/2020 | Chen | F16K 31/0672 |
| 10,775,813 | B2 * | 9/2020 | Nobili | F16K 31/404 |
| 11,162,605 | B2 * | 11/2021 | Boticki | F16K 31/082 |
| 11,261,992 | B2 * | 3/2022 | Tempel | F16K 27/0236 |
| 11,892,094 | B2 * | 2/2024 | Bian | F16K 31/365 |
| 2017/0090491 | A1 | 3/2017 | Nobili | |

FOREIGN PATENT DOCUMENTS

| | | |
|---|---|---|
| DE | 4341620 | 6/1995 |
| DE | 102016115793 | 3/2017 |
| DE | 102019103609 | 3/2017 |
| DE | 202017104187 | 8/2017 |
| DE | 102017105200 | 9/2018 |
| DE | 202018105509 | 12/2018 |
| EP | 2865929 | 4/2015 |
| EP | 3147546 | 3/2017 |
| EP | 3537015 | 9/2019 |
| EP | 3748207 | 12/2020 |

* cited by examiner

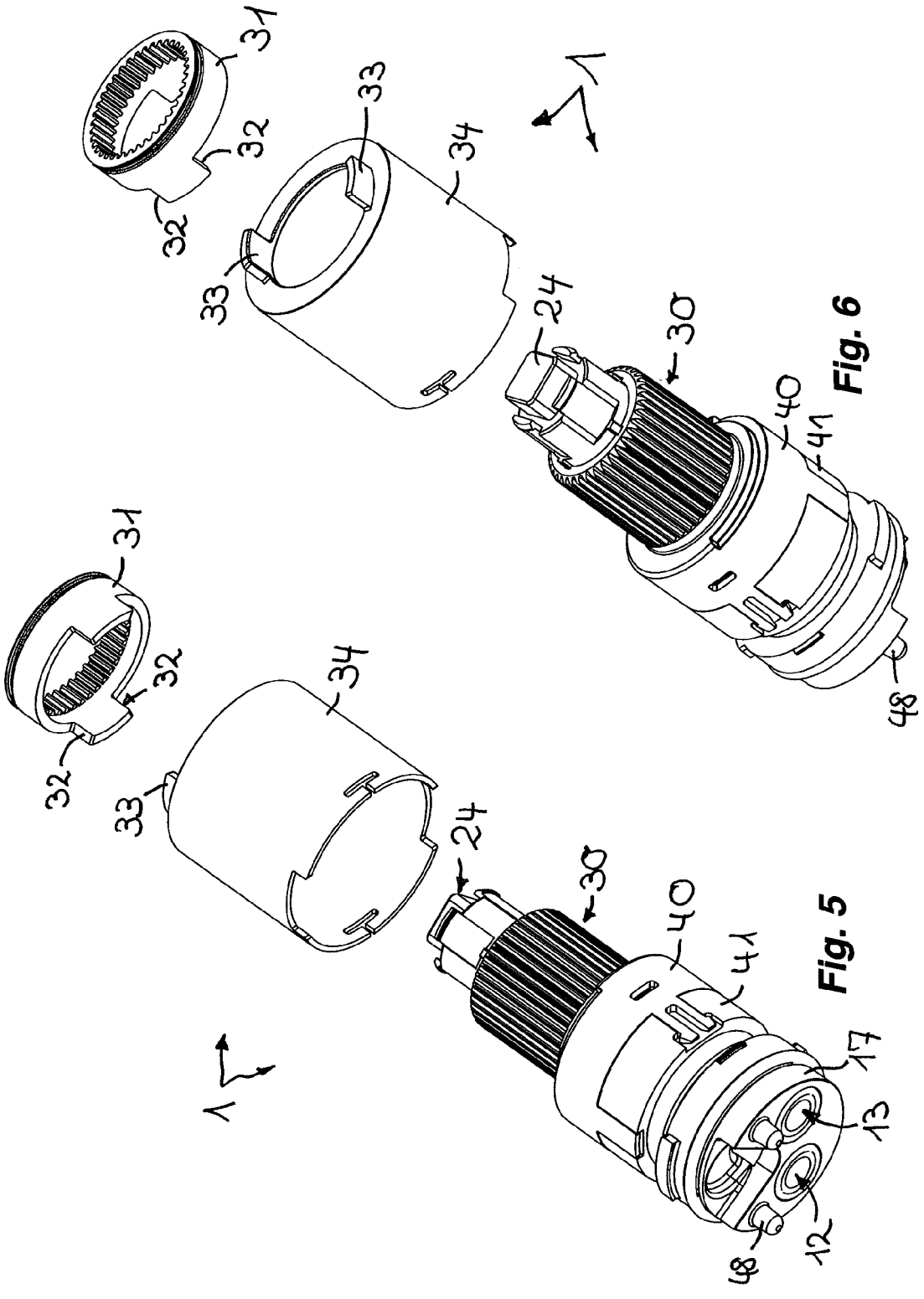

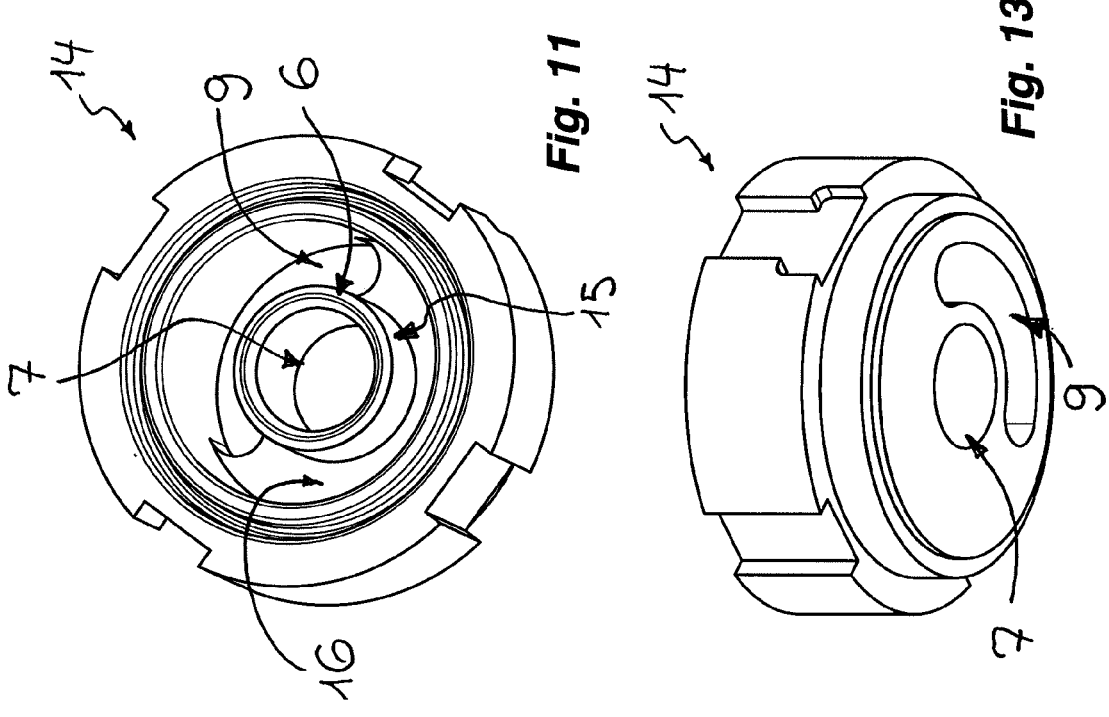
Fig. 10
Fig. 11
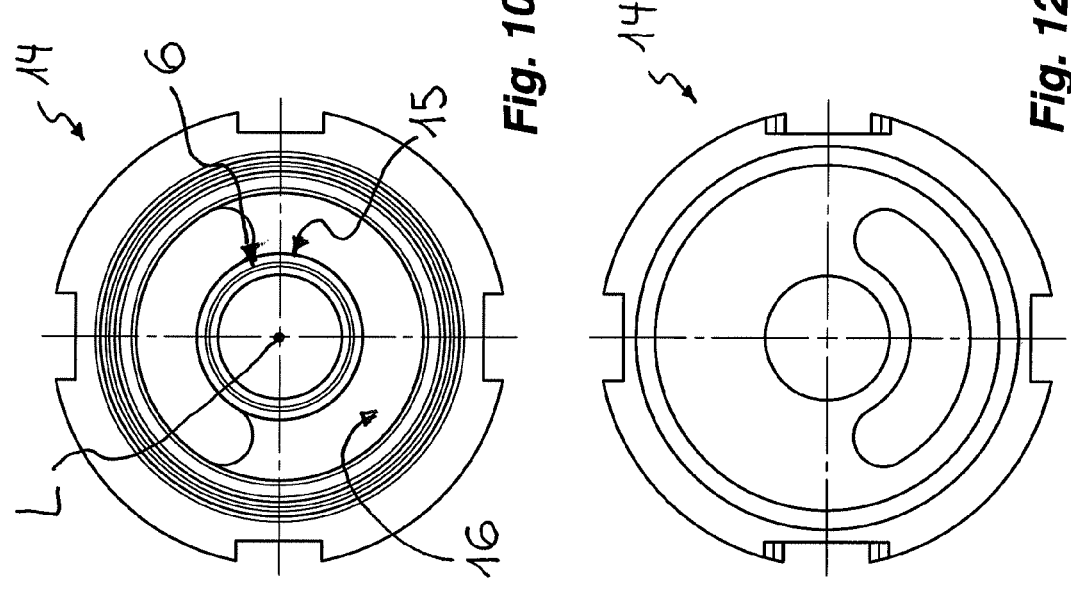
Fig. 12
Fig. 13

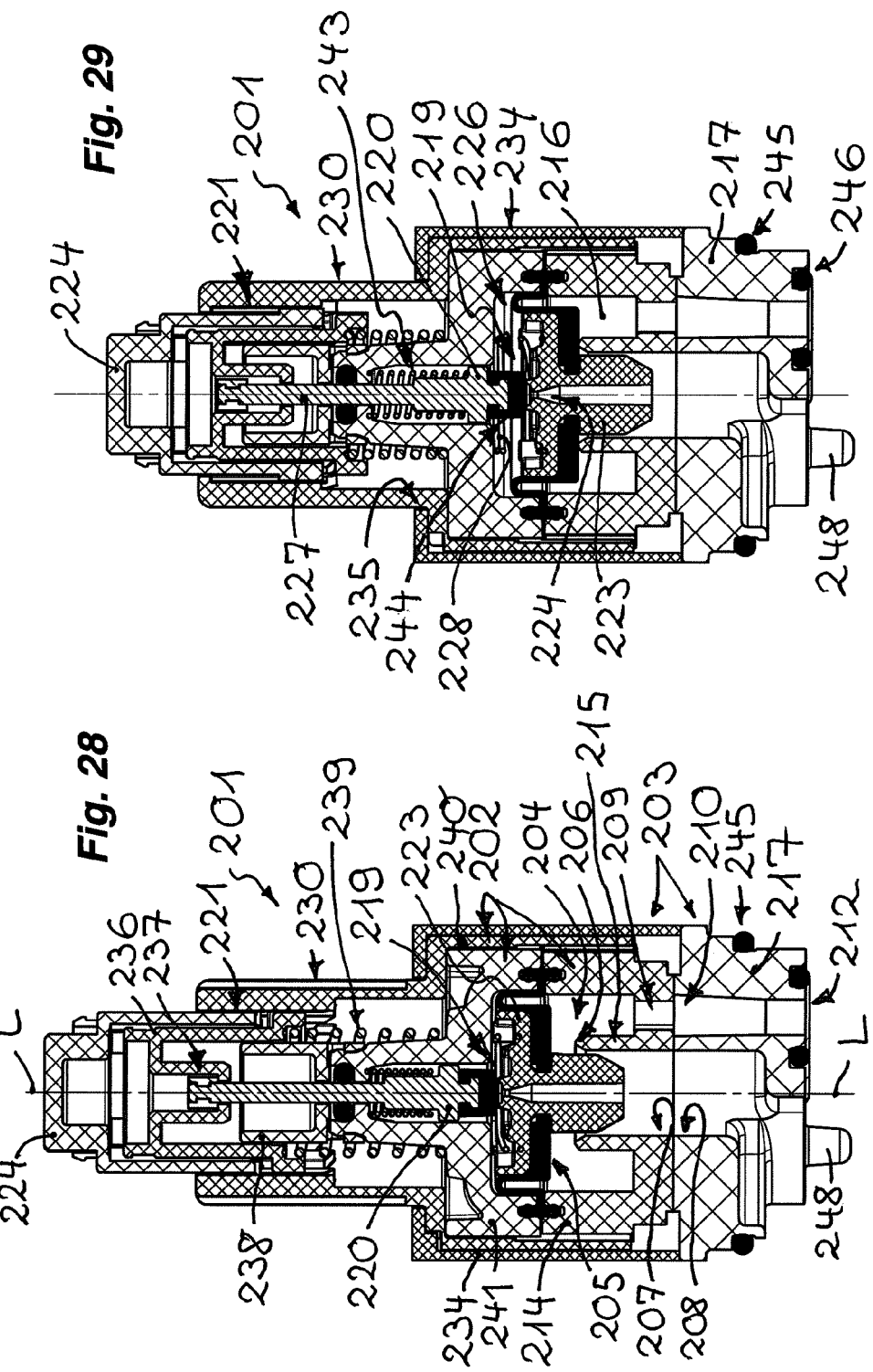

SANITARY VALVE

CROSS-REFERENCE TO RELATED APPLICATIONS

This application is a 371 National Phase of PCT/EP2022/ 053483, filed Feb. 14, 2022, which claims priority to German Patent Application No. 20 2021 100 840.7, filed Feb. 19, 2021, both of which are incorporated herein by reference as if fully set forth.

TECHNICAL FIELD

The invention concerns a sanitary valve comprising a main valve which has a movable diaphragm which can be moved between a closed position, in which the diaphragm lies tightly against a valve seat of the main valve, and at least one open position in which the diaphragm is spaced from the valve seat.

BACKGROUND

DE 10 2017 104 200 A1 already discloses a sanitary valve of the type cited initially, which can be connected in the water path of a water supply line for turning on or switching. For this, the previously known sanitary valve has a main valve, the valve inlet of which is connected to an inflow-side line portion and the valve outlet of which is connected to an outflow-side portion of the water path. The main valve has a movable diaphragm which lies tightly on a valve seat in the closed position of the main valve, and which opens the valve seat in an open position. The previously known sanitary valve also has a pilot valve via which the main valve can be actuated between an open position and a closed position. The position of the diaphragm can be predefined by the position of the valve lifter which is in control connection with a push-push mechanism, via which the valve lifter can be switched between a switch position corresponding to the open position and a switch position corresponding to the closed position. Between the open position and the closed position, the push-push mechanism may in stages also predefine intermediate positions in which the diaphragm is held at varying distances from the valve seat, and hence opens a through-flow cross-section which is reduced in comparison with the open position. A stepless quantity regulation of the water quantity flowing through the main valve, or regulation and mixing of the fluids flowing from the different fluid supplies, is not however possible with the previously known sanitary valve.

DE 10 2016 115 793 A1 already discloses a sanitary valve unit which may be mounted for example in a water tap for a bathroom. This previously known valve unit is fitted into a main tap body of the tap, and comprises a temperature control valve, a water-saving valve and a touch element. The temperature control valve is integrated in a mounting chamber in the main tap body. The temperature control valve has a water inlet part, a mixing chamber and a water outlet part, wherein cold water and hot water flow into the water inlet part and are mixed in a predefined ratio into mixed water in the mixing chamber, from where the mixed water emerges via the water outlet part. The temperature control valve of the previously known valve unit comprises an inner water inlet valve seat, a mixing valve insert and a temperature control valve bush body. The inner water inlet valve seat is provided with a cold water inlet through-flow channel and a hot water inlet through-flow channel, wherein the cold water flows in the cold water inlet through-flow channel and the hot water in the hot water inlet through-flow channel. The cold water inlet through-flow channel and the hot water inlet through-flow channel form the water inlet part of the previously known valve unit. The water inlet valve seat is fixedly connected to the lower end of the mixing valve insert, wherein a mixing chamber and a mixed water outlet through-flow channel, communicating with the mixing chamber, are delimited in the interior of the mixing valve insert, and wherein the mixed water outlet through-flow channel is situated in the water outlet part. The temperature control valve bush body may be drawn over the mixing valve insert with limited rotatability within a predefined angular region, and is axially delimited between the mixing valve insert and the water inlet valve seat. A cold water passage channel and a hot water passage channel are delimited between the temperature control valve bush body and the mixing valve insert. When the temperature control valve bush body is turned, the through-flow quantity of the water flowing between the cold water passage channel and the cold water supply through-flow channel, and the through-flow quantity of the water flowing between the hot water passage channel and the hot water supply through-flow channel, are directly regulated in order to control the mixing ratio of the hot and cold water flowing to the mixing chamber, and hence the mixed water temperature.

Since the valve unit known from DE 10 2016 115 793 A1 has a temperature control valve and a water-saving valve, and since the temperature control valve of the previously known valve unit with its water inlet part, mixing chamber and water outlet part are assembled from multiple separate constituents, the previously known sanitary valve unit has a comparatively large installation length.

EP 2 865 929 A1 discloses a device for regulating the water in a shower, a bathroom or washbasin, which comprises the following: a closure with at least one metal part which is displaceable in a cylindrical chamber with a diameter substantially corresponding to the diameter of the closure; a magnet connected to the metal part of the closure; a push-button which is configured to move the magnet and closure along an axis of the cylindrical chamber into two different positions which correspond to the opening of the through-flow or the closure of the through-flow of water from a diffuser, wherein the push-button is also rotatable about the axis in order to change the open position of the closure along the axis and a corresponding through-flow quantity; wherein the device furthermore has a knob which is rotatable about the axis for adjusting the temperature of the water.

SUMMARY

The object is therefore to create a sanitary valve of the type cited initially which, via a closing function for opening and closing the water outlet, also allows a mixing function for mixing the water flowing in from the different supply lines, for example hot and cold water, or regulation of the fluid volume flowing out of the sanitary valve according to the invention per time unit, and which nonetheless is distinguished by a compact construction comparatively short installation length.

This object is achieved according to the invention with a sanitary valve of the type cited initially, in particular in that the main valve is provided in the interior of an inner housing which is mounted in an outer housing so as to be rotatable about a rotational axis; that the inner housing is equipped with a first valve opening which is fluid-conductively connected to a first valve opening in the outer housing in order to form a valve outlet, which pair of first valve openings is arranged in the rotational axis of the outer housing and inner housing; that the inner housing has at least one second valve opening which is arranged on the outside relative to the valve outlet and is paired with at least one second valve opening in the outer housing in order to form at least one valve inlet; that the respectively paired second valve openings can be brought into congruence by a relative twisting of the inner housing and the outer housing such that the remaining clear opening cross-section of the at least one valve inlet created by the congruence of the respectively paired second valve openings is variable; that the inner housing has a pot-shaped housing lower part, with a pot-base inside from which a valve connector protrudes which connects the first valve opening of the inner housing forming the valve outlet to the valve seat formed by the free sleeve end region of the valve connector; and that the housing lower part having the valve openings of the inner housing thereby lies fluid-tightly on the outer housing, at least in a ring zone of the pot base on the outside relative to the valve openings, and/or the housing outer periphery of the inner housing.

The sanitary valve according to the invention has an inner housing which is rotatably mounted in an outer housing. A main valve is provided in the housing interior of the inner housing and has a movable diaphragm which can be moved between a closed position, in which the diaphragm lies tightly on a valve seat of the main valve, and at least one open position in which the diaphragm is spaced from the valve seat. By means of this main valve therefore, the fluid outlet from the sanitary valve according to the invention can be optionally or alternately opened or closed. The inner housing, mounted rotatably about a rotational axis in the outer housing, has a first valve opening which is connected fluid-conductively to a first valve opening in the outer housing to form a valve outlet of the main valve, wherein this pair of first valve openings is arranged in the rotational axis between the outer and inner housings. The valve housing also has at least one second valve opening which is arranged on the outside relative to the valve outlet of the sanitary valve according to the invention, and is paired with at least one second valve opening in the outer housing to form at least one valve inlet. In order to regulate the fluid flowing in via the at least one valve outlet in its volume flow passing through the sanitary valve, and/or to mix fluids with different properties e.g. hot or cold water, the respectively paired second valve openings can be brought into congruence by relative twisting of the inner and outer housings, such that the remaining clear opening cross-section of the at least one valve inlet created by congruence of the respectively paired second valve openings is variable. Here the inner housing has a pot-like housing lower part with a pot-base inside from which a valve connection protrudes, which connects the first valve opening of the inner part forming the valve outlet to the valve seat formed by the free sleeve end region of the valve connector. In this way, a fluid chamber is formed between the valve connector and the housing inner periphery of the housing lower part, which when the sanitary valve according to the invention is configured as a mixing valve, may also serve as a mixing chamber. The housing lower part having the valve openings of the inner housing lies fluid-tightly on the outer housing, at least in a ring zone of the pot base lying on the outside relative to the valve openings, and/or with the housing outer periphery of the housing lower part.

In order to further promote the compact design of the sanitary valve according to the invention, it may be advantageous if the outer housing has a preferably disc-like or plate-like housing base on which the housing lower part of the inner housing lies fluid-tightly and rotatably, at least in its outer ring and/or circumferential zone. In this embodiment according to the invention, the disc-like or plate-like housing base, with the exception of the valve openings provided therein, may be configured as a structurally simple, solid component.

So that the housing lower part of the inner housing lies fluid-tightly on the outer housing, at least in an outer ring zone of the pot base and/or with its housing outer periphery, it is advantageous if the housing lower part of the inner housing and/or the/a housing base of the outer housing is/are made of ceramic. Here, these components of outer housing and inner housing lie fluid-tightly against one another without wear when the housing lower part—and preferably also the housing base—are made of ceramic.

In order for the water flowing through the fluid or mixing chamber in the housing lower part to be able to emerge cleanly from this fluid or mixing chamber, it is advantageous if the first valve openings of the outer housing and inner housing have circular round and/or congruent opening cross-sections, at least in their mutually adjacent regions.

In order to be able to regulate well the volume flowing through the sanitary valve according to the invention, it is advantageous if the second valve opening in the inner housing, which is connected fluid-conductively to at least one second valve opening in the outer housing, is formed as a sickle-shaped or arcuate slot.

Preferred exemplary embodiments of the sanitary valve according to the invention provide that the sanitary valve is configured as a closing and mixing valve or as a closing and regulating valve.

In order to be able to configure the sanitary valve according to the invention as a closing and mixing valve, it is advantageous if the first valve opening in the inner housing is paired with at least two second valve openings in the outer housing, such that by relative twisting of the inner and outer housings, the clear opening cross-section between the second valve opening in the inner housing and at least one of the second valve openings provided in the outer housing is reducible and at the same time enlargeable relative to the second valve opening in the inner housing and at least one other valve opening of the second valve openings provided in the outer housing, and vice versa.

If the sanitary valve according to the invention is configured as a closing and mixing valve, it is advantageous if the second valve openings provided in the outer housing can be connected to different fluid supplies, for example for hot and cold water.

The structurally simple, low-maintenance and compact construction of the sanitary valve according to the invention is further promoted if the annular space provided between the valve connector and the housing inner periphery of the housing lower part forms a mixing chamber.

A preferred exemplary embodiment of the invention provides that the housing lower part is connected to a one-piece, two-piece or multipiece housing upper part of the inner housing; that the diaphragm is clamped in a clamping zone between the housing lower part and the housing upper part of the inner housing; and that the diaphragm, at least with its clamping zone, seals between the housing lower part and the housing upper part of the inner housing.

With this solution according to the invention, the diaphragm is clamped in a clamping zone between the housing lower part and a housing upper part of the housing. The diaphragm here seals between the housing lower part, consisting for example of ceramic, on one side, and the housing upper part of the housing, preferably made of plastic, on the other.

A preferred exemplary embodiment according to the invention provides that the housing lower part and the housing upper part of the inner housing are made of different materials, and/or that the housing upper part of the inner housing is made of plastic.

To be able to operate the sanitary valve according to the invention with reliable function, any mechanism is suitable which allows the diaphragm to rest on the valve seat of the main valve, or to lift away from the valve seat. A refined embodiment of the invention however provides that in its inner housing, the sanitary valve has a pilot valve via which the main valve can be actuated between the open position and the closed position; and that the position of the dia-phragm can be predefined by the position of a valve lifter connected to a push-push mechanism, by means of which the valve lifter can be switched between a switch position corresponding to the open position and a switch position corresponding to the closed position of the sanitary valve. The preferred exemplary embodiment described here allows a functionally reliable and stable actuation of the sanitary valve according to the invention with comparatively little complexity.

In order to reduce the risk of undesired leakage and to lower the number of ring seals required on the sanitary valve according to the invention, it is advantageous if the free sleeve end region of the valve connector formed as a valve seat is arranged at a distance below a separating plane arranged between the housing lower part and the housing upper part of the inner housing.

Simple handling and operation of the sanitary valve according to the invention are further promoted if a guide portion of the inner housing protrudes over the outer hous-ing, wherein a push-button in control connection and/or active connection with the valve lifter is displaceably guided in said guide portion of the inner housing. By actuating the push-button, the pilot valve in the inner housing can be actuated, via which the main valve can be controlled and optionally or alternately moved into its closed or open position.

In order to be able to convert a rotational movement acting on the guide portion into a relative twist of the inner and outer housings, it is advantageous if the guide portion of the inner housing is rotationally fixedly connected to its housing lower part and/or housing upper part, and config-ured as a rotatable actuating element for relative twisting of the inner housing and outer housing.

In order to keep the pressure force, necessary for actuating the sanitary valve according to the invention and exerted on the push-button, as low as possible, it is advantageous if the valve seat, which can be closed by the diaphragm, is arranged between the valve outlet and the at least one valve inlet, wherein the diaphragm closes a pressure chamber which can be filled via the at least one valve inlet so that the diaphragm, when the pressure chamber is filled, in a closed position closes the valve seat and when the pressure cham-ber is pressure-relieved, in an open position opens the valve seat.

A preferred embodiment according to the invention pro-vides that a pressure-relief opening on the diaphragm, which opens into the at least one valve outlet, can be closed by the valve lifter.

BRIEF DESCRIPTION OF THE DRAWINGS

Refinements according to the invention arise from the following description of the figures in conjunction with the

Figures 1, 2:
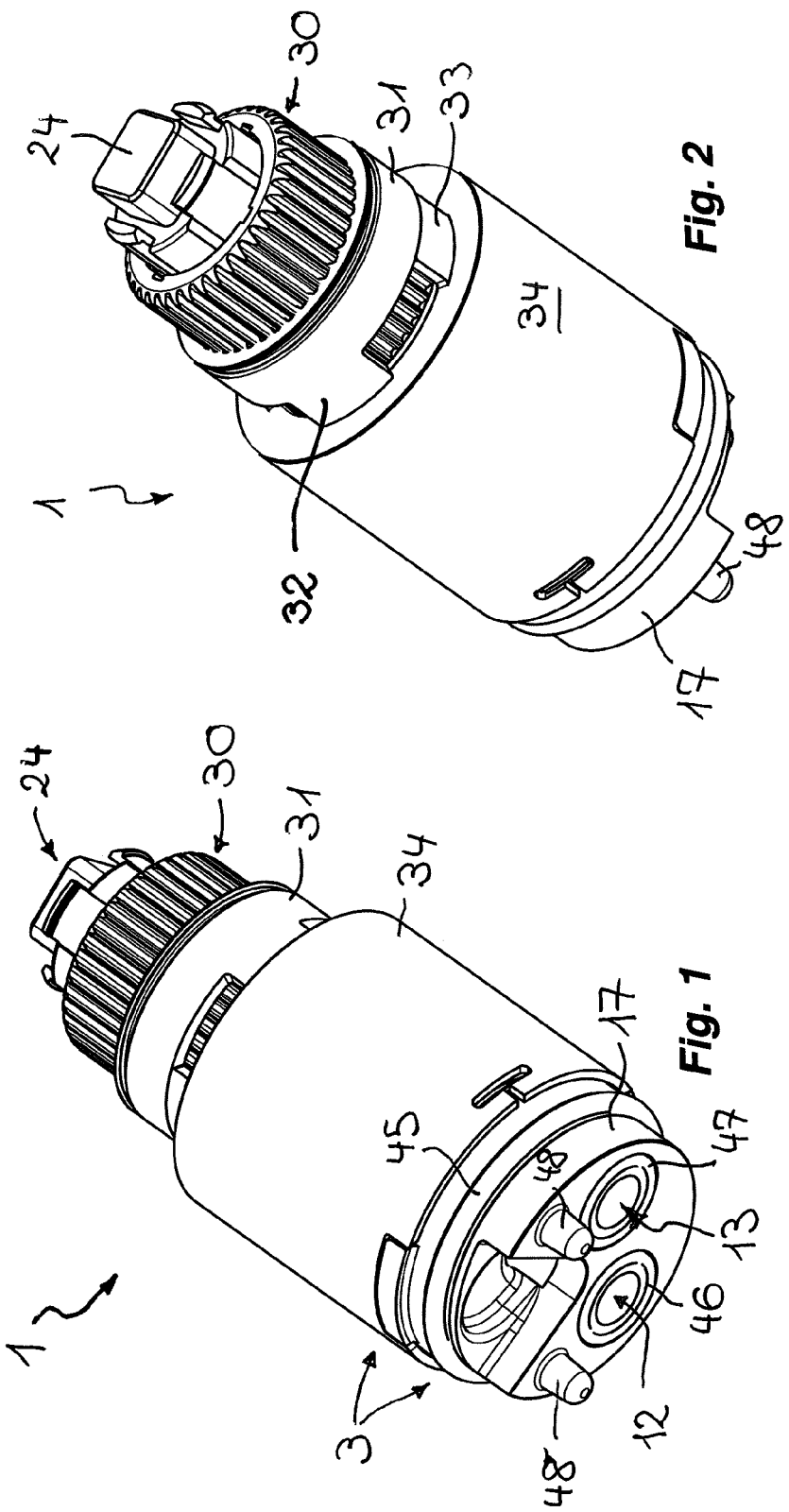

6 claims and drawing. The invention is explained in more detail below with reference to preferred exemplary embodi-ments.

Figures 3, 4:
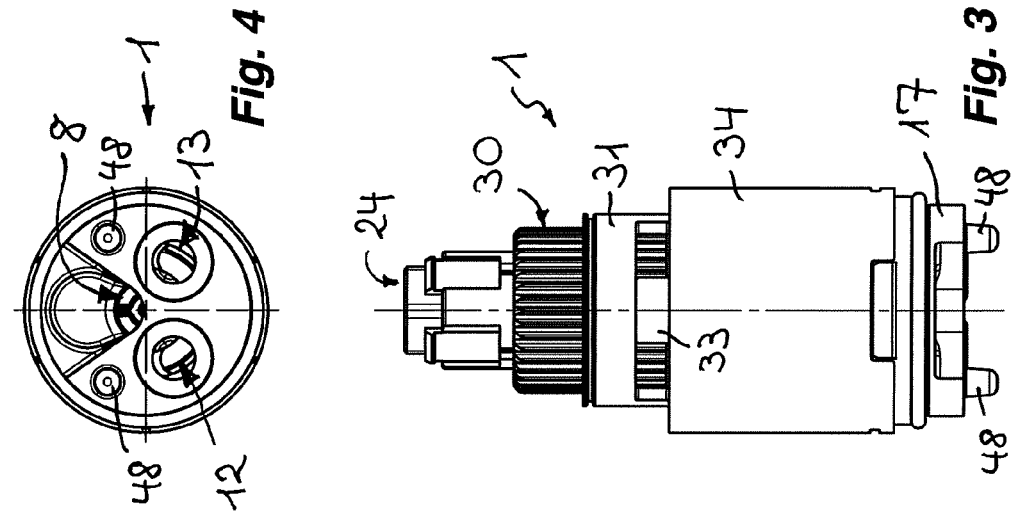
Figures 7, 8, 9:
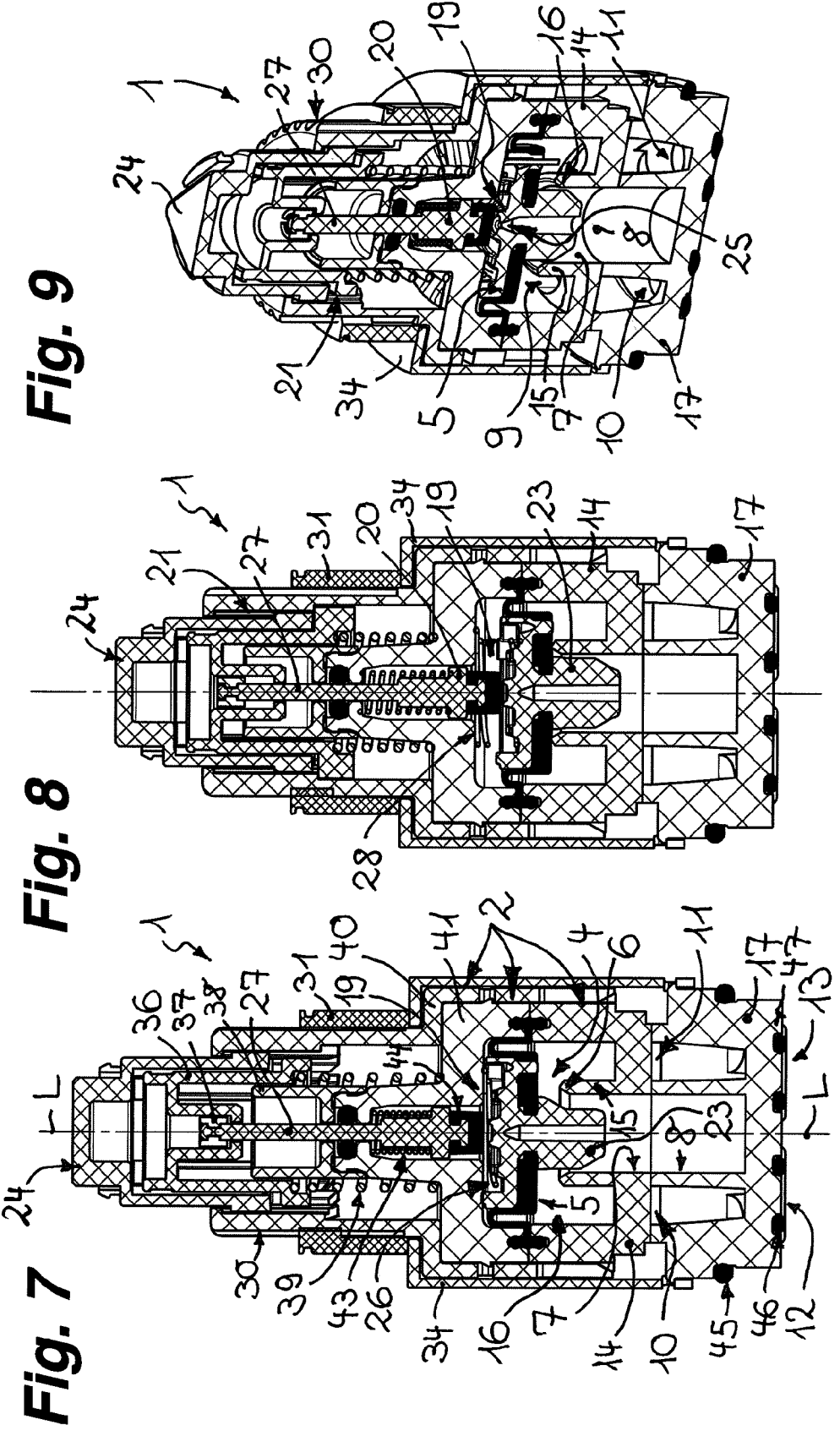
Figures 14, 15, 16, 17, 18, 19:
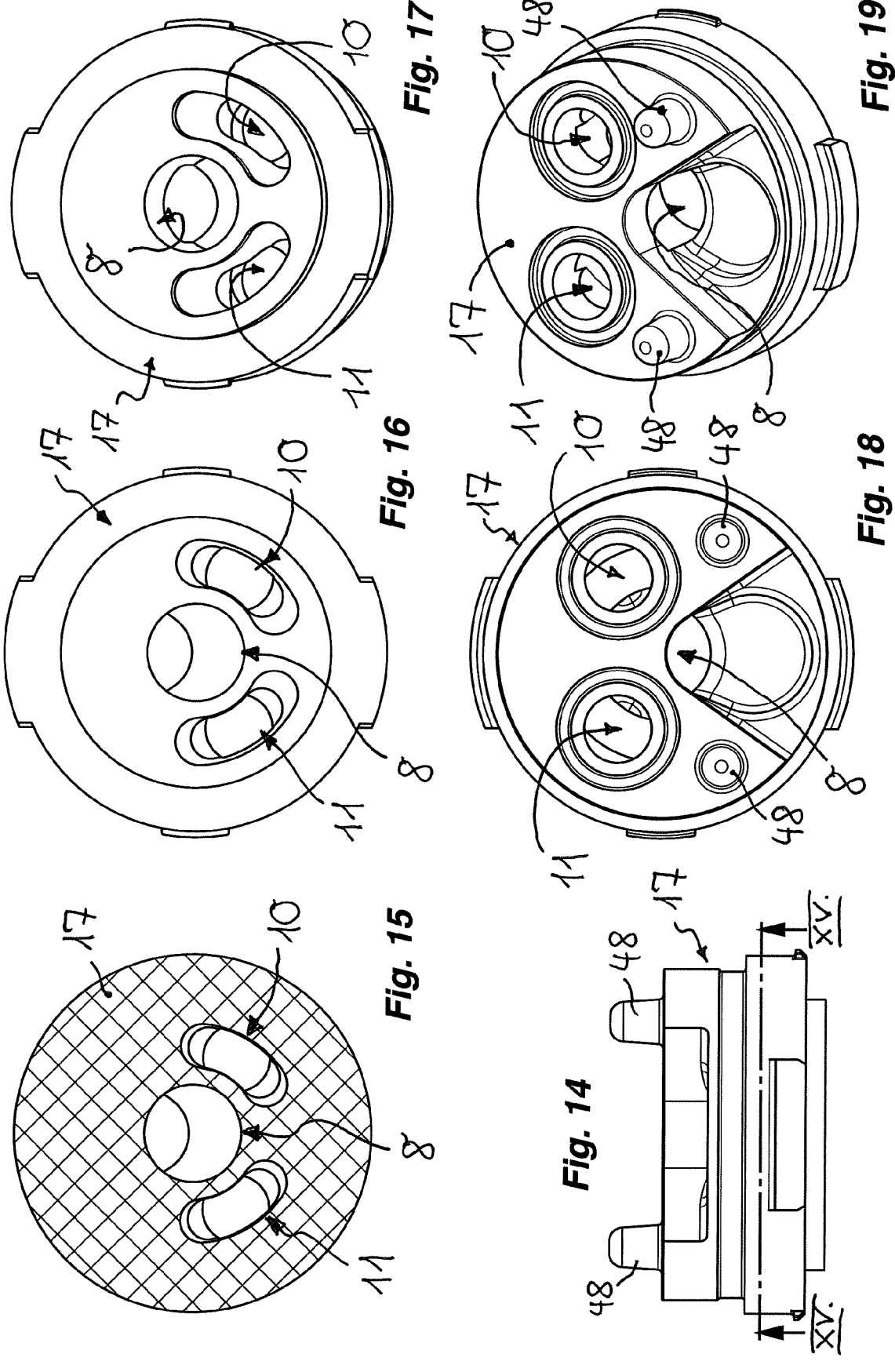
Figures 20, 21:
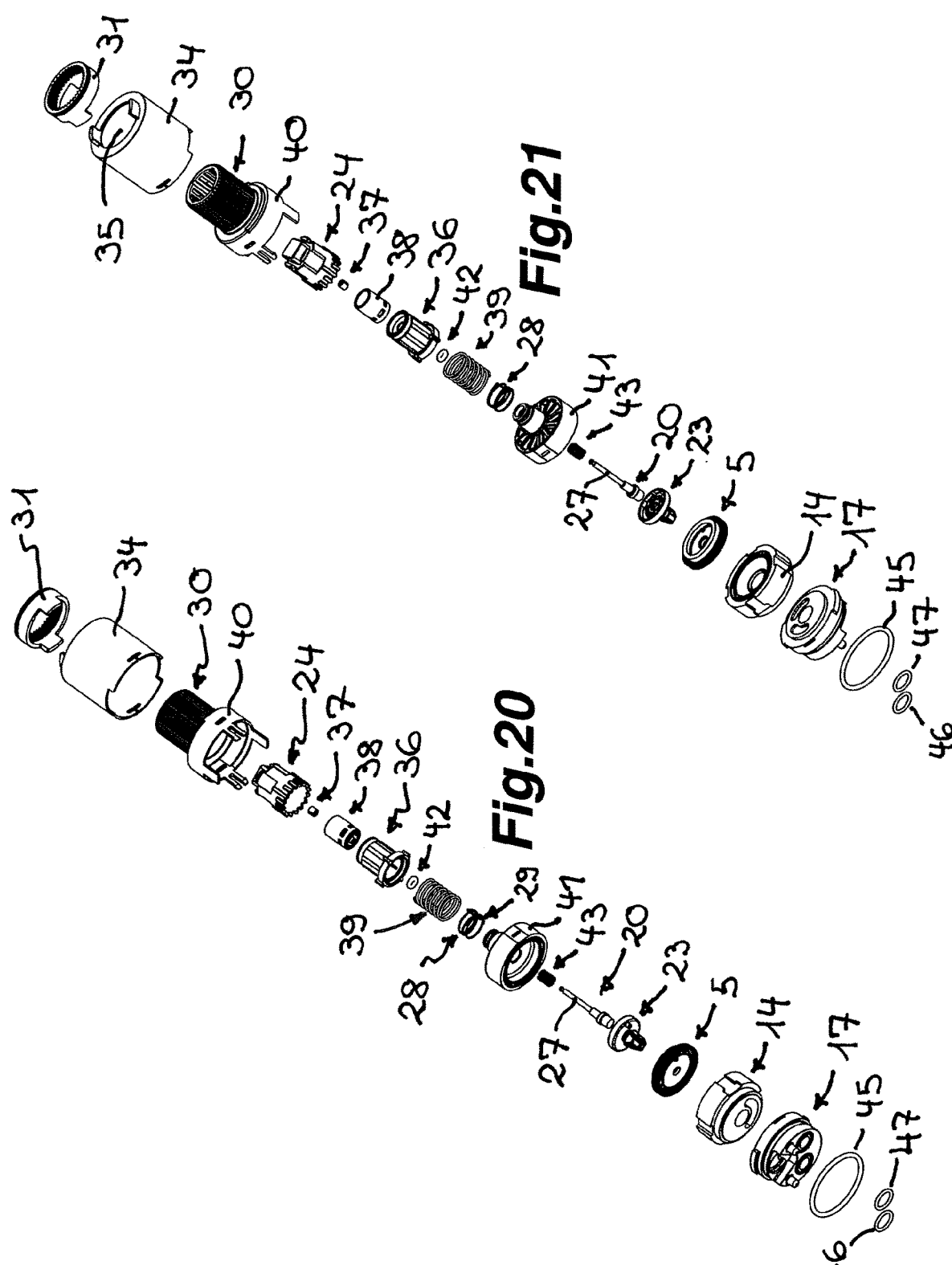
Figures 22, 23:
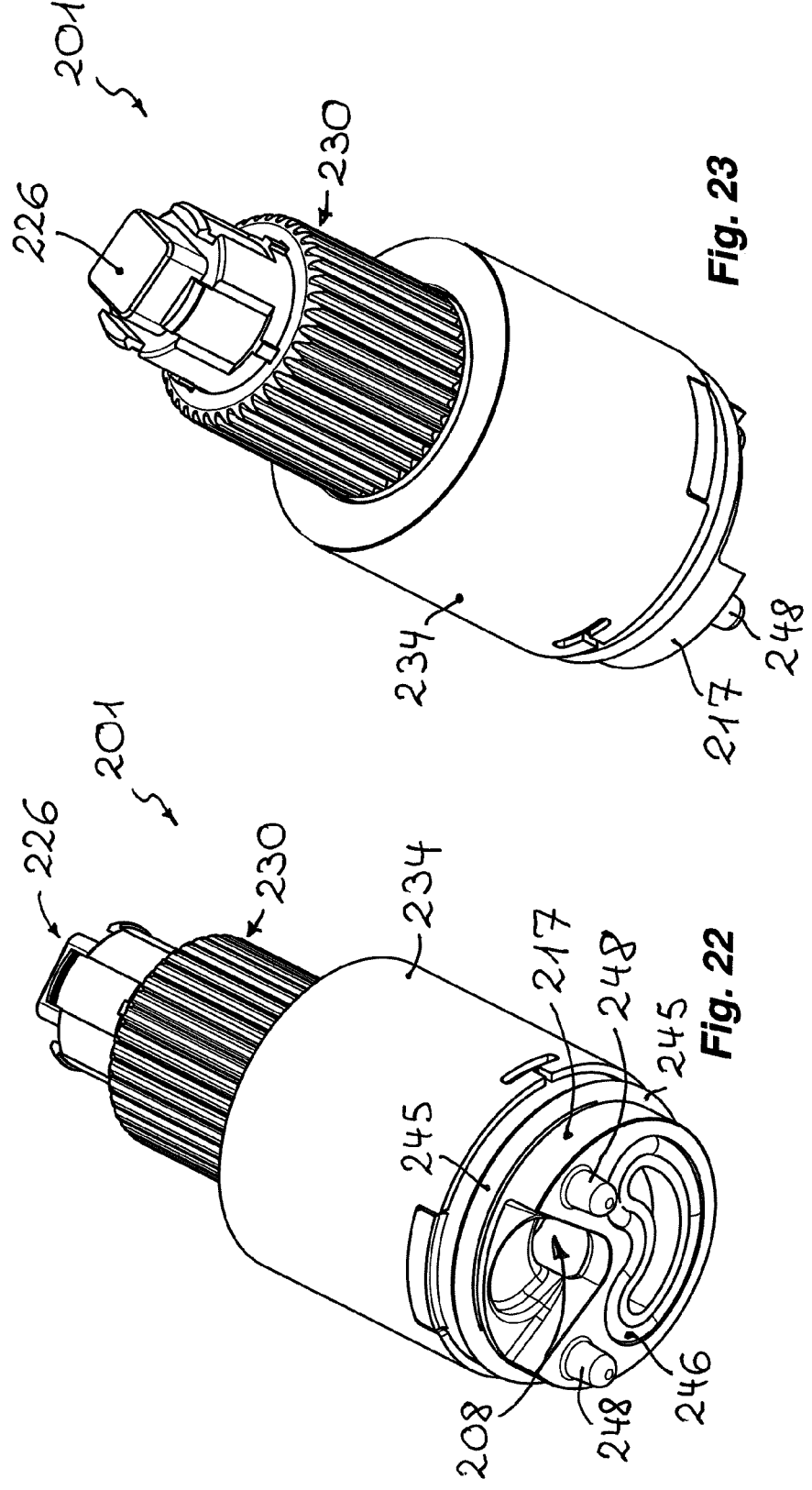
Figures 24, 25:
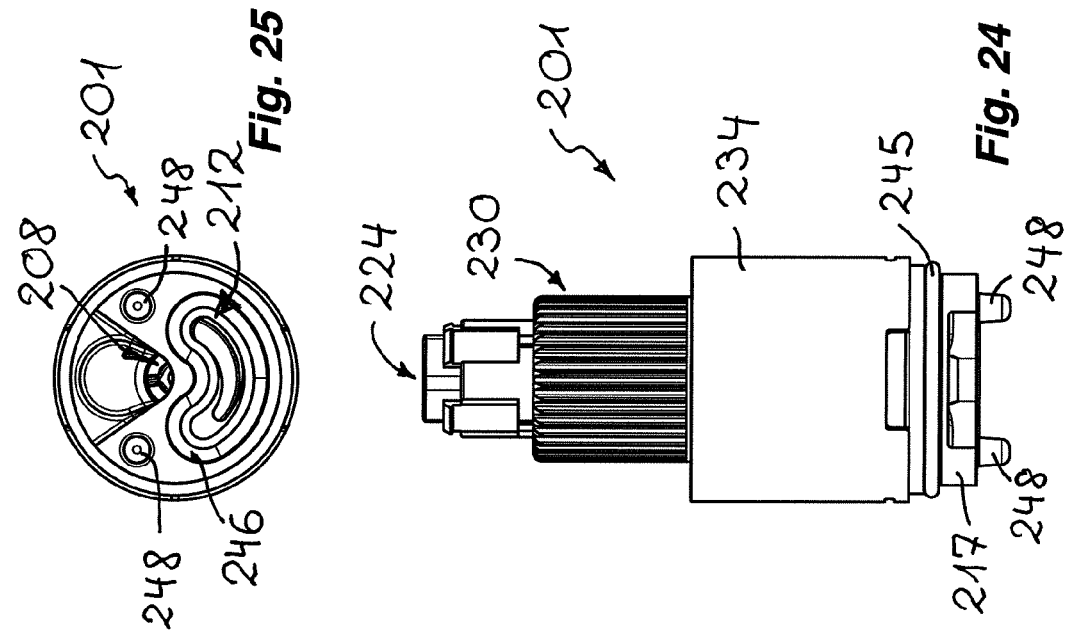
Figures 26, 27:
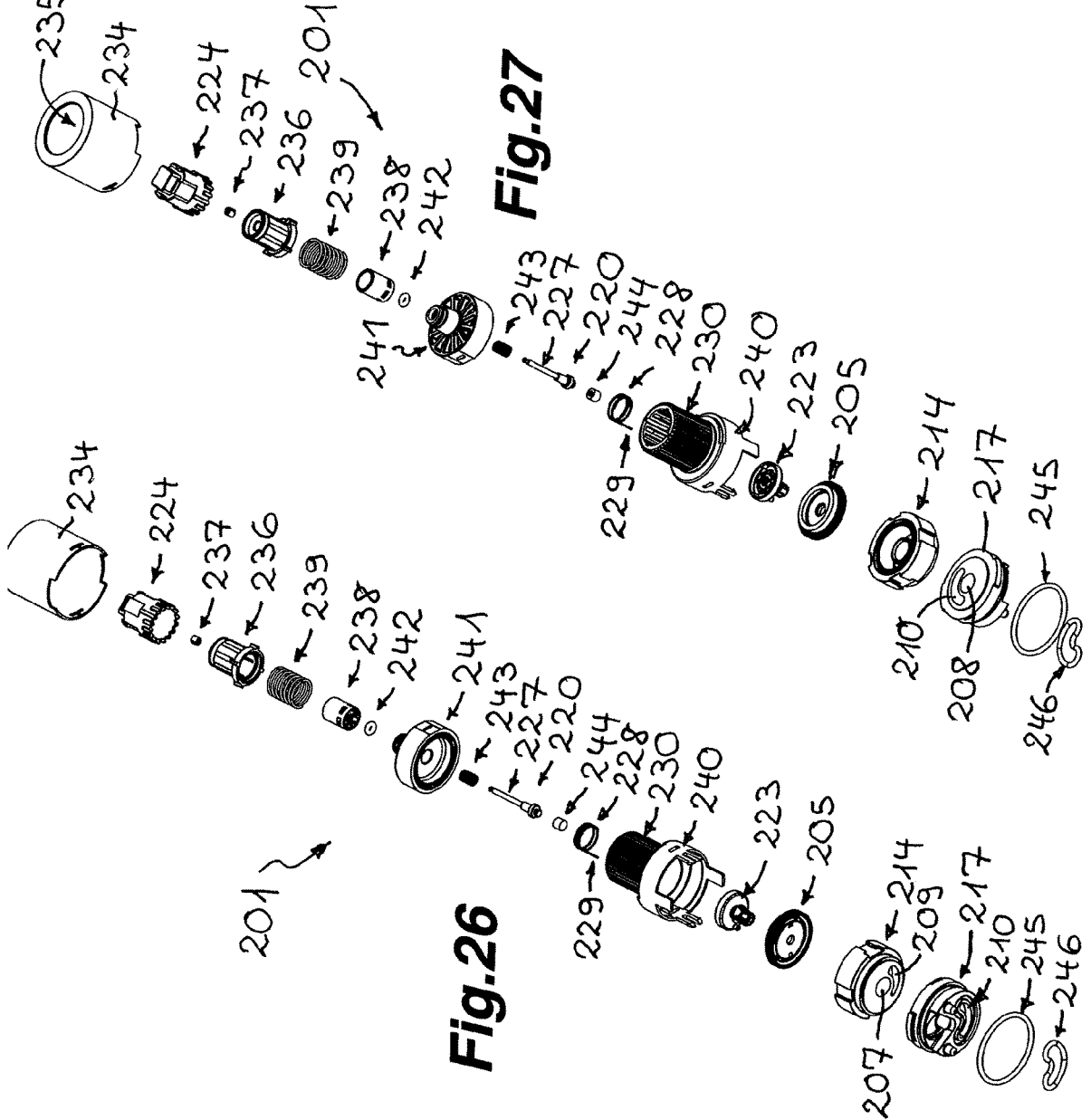
Figures 30, 31, 32, 33:
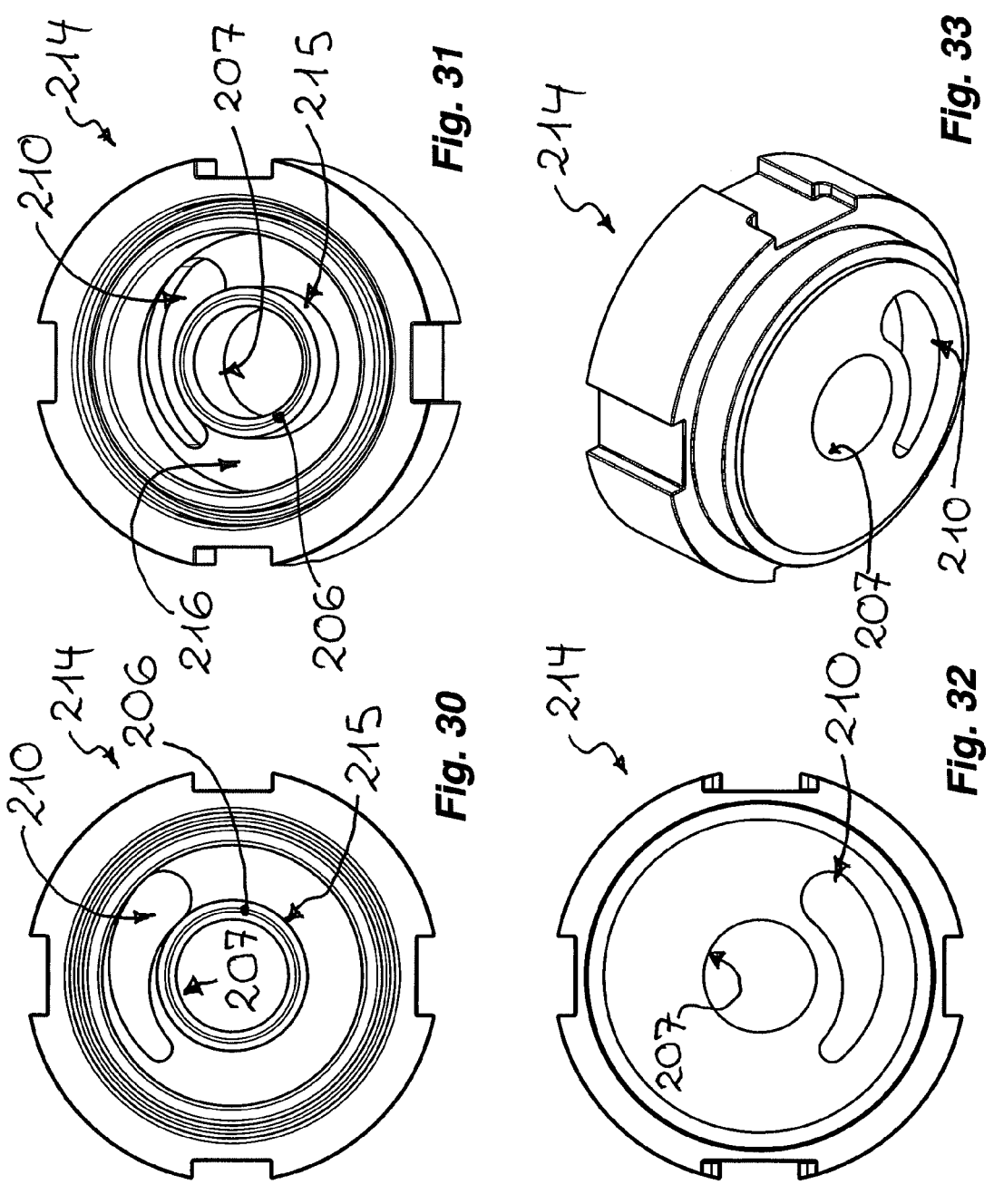
Figures 34, 35, 36, 37:
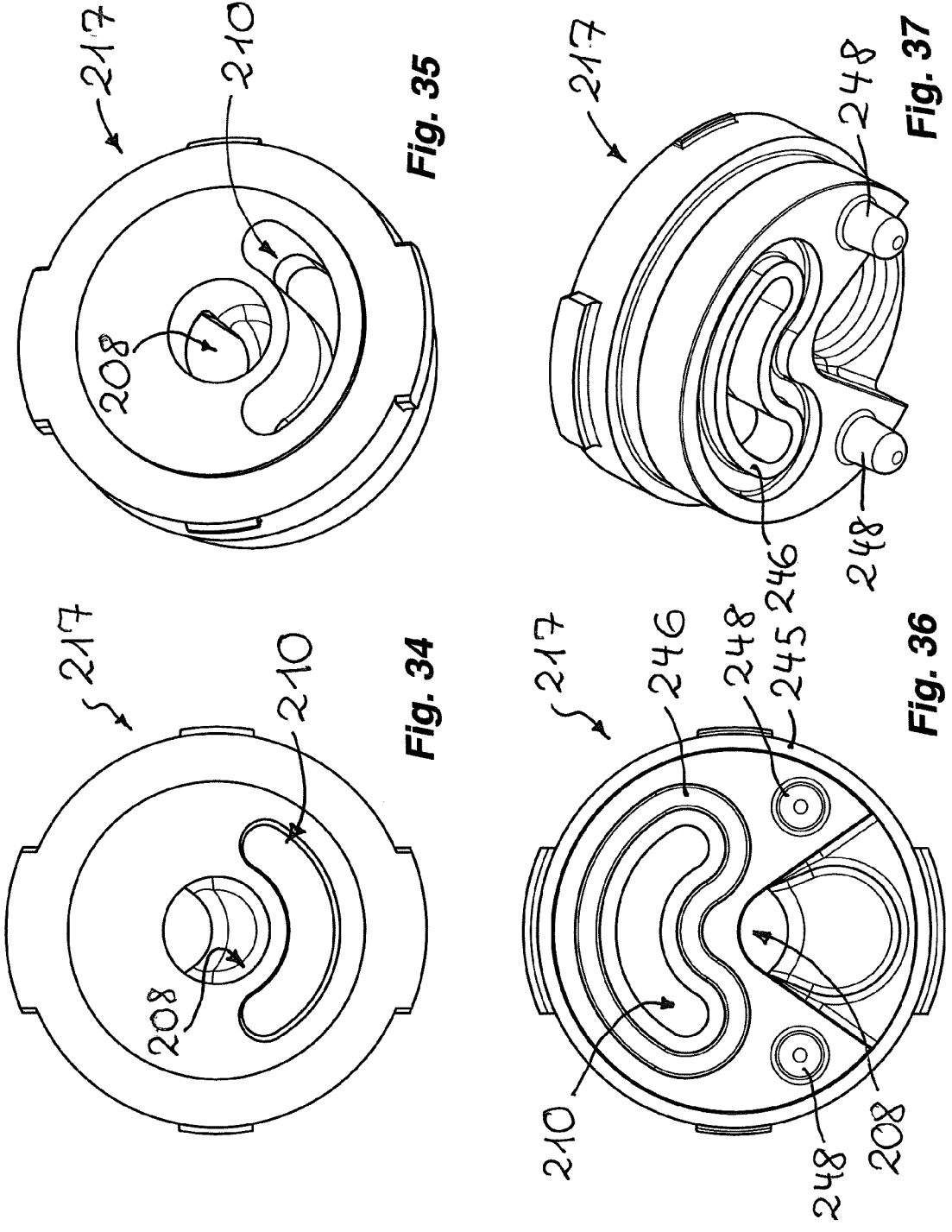
Figures 38, 39, 40:
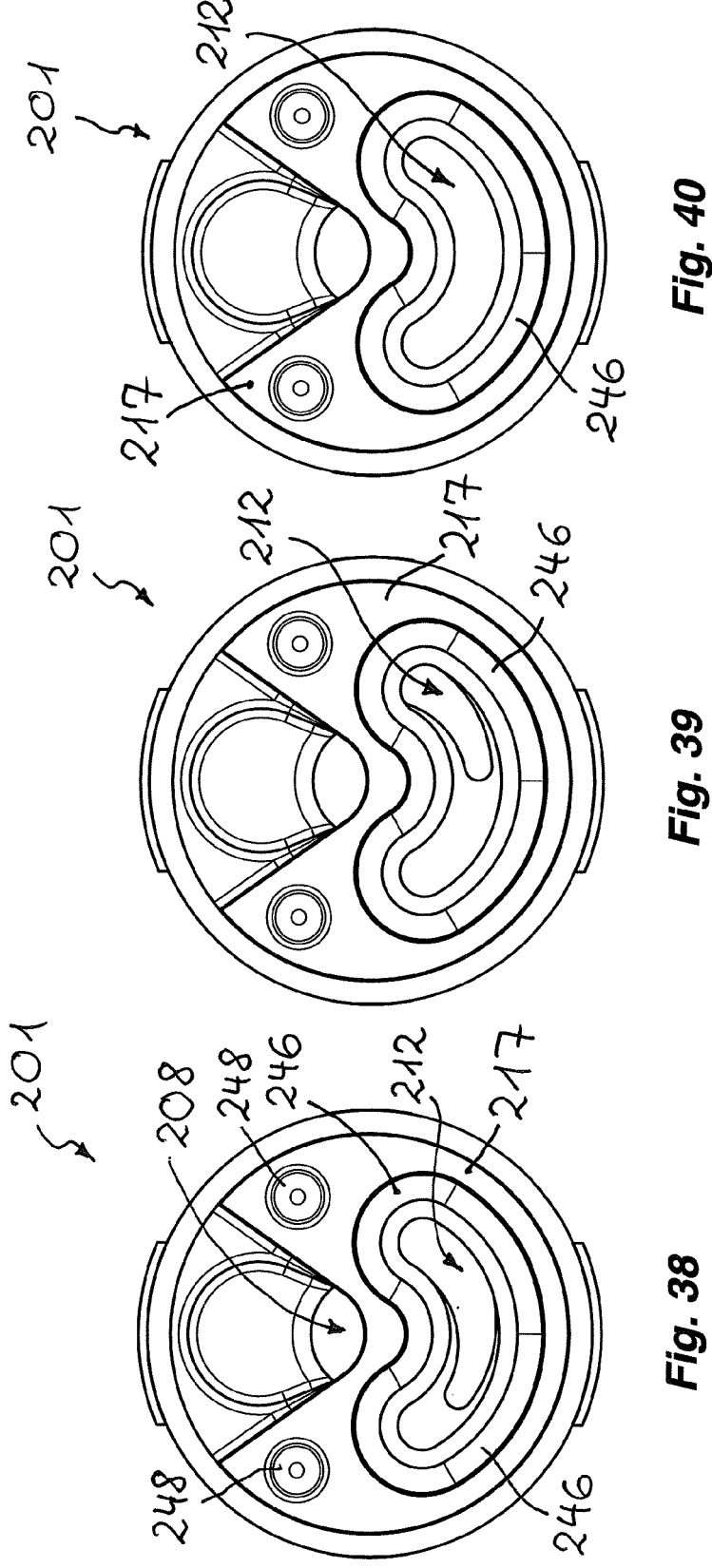

In the drawings:

FIG. 1 shows a sanitary valve configured as a closing and mixing valve in a perspective illustration looking onto the underside or back of said sanitary valve, FIG. 2 shows the sanitary valve from FIG. 1 in a per-spective illustration looking onto the front or top of said sanitary valve, FIG. 3 shows a side view of the sanitary valve from FIGS. 1 and 2, FIG. 4 shows the sanitary valve from FIGS. 1 to 3 in a top view onto the underside or back of said sanitary valve, FIG. 5 shows the sanitary valve from FIGS. 1 to 4 in an exploded perspective illustration of individual components, wherein the sanitary valve and its separated components are shown in a top view onto the back or underside, FIG. 6 shows the sanitary valve from FIGS. 1 to 5 in an exploded perspective illustration of individual components, wherein the sanitary valve is here shown looking onto the front or top side of the sanitary valve, FIG. 7 shows the sanitary valve from FIGS. 1 to 6 in a longitudinal section, wherein the sanitary valve is here shown in an open position of the main valve integrated in the sanitary valve, FIG. 8 shows, also in longitudinal section here, the sanitary valve from FIGS. 1 to 7 in the closed position of its main valve, FIG. 9 shows the sanitary valve from FIGS. 1 to 8 in an isometrically illustrated longitudinal section, wherein the sanitary valve has a lower housing base of an outer housing on which lies the pot-like housing lower part of an inner housing, which inner housing is mounted rotatably in the outer housing, FIG. 10 shows the pot-like housing lower part of the sanitary valve configured according to FIGS. 1 to 9, in a top view onto an internal housing chamber, FIG. 11 shows the housing lower part from FIG. 10 in a perspective illustration looking onto the housing chamber, FIG. 12 shows the housing lower part from FIGS. 10 and 11 in a top view onto the back or underside of the housing lower part facing the housing base, FIG. 13 shows a housing lower part from FIGS. 10 to 12 in a perspective illustration looking onto the back or under-side of the housing lower part, FIG. 14 shows the housing base situated in the outer housing of the sanitary valve shown in FIGS. 1 to 9, in an upside-down side view, FIG. 15 shows the housing base from FIG. 14 in a cross-section through section plane XIV-XIV of FIG. 14, FIG. 16 shows the housing base from FIGS. 14 and 15 in a top view onto the front, end or flat side of the housing base facing the housing lower part of the inner housing, FIG. 17 shows the housing base from FIGS. 14 to 16 in a perspective illustration looking onto the front side of the housing base facing the housing lower part, FIG. 18 shows the housing base from FIGS. 14 to 17 in a top view onto the back of the housing base facing away from the housing lower part, FIG. 19 shows the housing base from FIGS. 14 to 18 in a perspective illustration looking onto the back end face of the housing base facing away from the housing lower part, FIG. 20 shows the sanitary valve from FIGS. 1 to 9 in an exploded, perspective, detail illustration looking onto the front side of its individual components, FIG. 21 shows the sanitary valve from FIGS. 1 to 9 in an exploded, perspective, detail illustration looking onto the back of its individual components, FIG. 22 shows a sanitary valve, here configured as a closing and regulating valve, in a perspective illustration looking onto the back or underside of the sanitary valve, FIG. 23 shows the sanitary valve from FIG. 22 in a perspective illustration looking onto the front or top side of said sanitary valve, FIG. 24 shows the sanitary valve from FIGS. 22 and 23 in a side view, FIG. 25 shows the sanitary valve from FIGS. 22 to 24 in a top view onto the back or underside of the sanitary valve, FIG. 26 shows the sanitary valve from FIGS. 22 to 25 in an exploded, perspective illustration of its individual components, wherein the individual components of the sanitary valve are here shown in a view onto the back or underside of these components, FIG. 27 shows the sanitary valve from FIGS. 22 to 26 in an exploded, perspective illustration of its individual components, wherein these components are here shown in a view onto the front or top side of these components, FIG. 28 shows the sanitary valve from FIGS. 22 to 27 in a longitudinal section, wherein the sanitary valve is here shown in the open position of its main valve, FIG. 29 shows, again in longitudinal section, the sanitary valve from FIGS. 22 to 28, wherein the main valve is here shown in its closed position, FIG. 30 shows the housing lower part of the sanitary valve shown in FIGS. 22 to 29 in a top view onto the internal housing chamber of the housing lower part, FIG. 31 shows the housing lower part from FIG. 30 in a perspective illustration looking onto the housing chamber arranged in the housing interior between a central valve connector on one side and the housing inner periphery of the housing lower part on the other, FIG. 32 shows the housing lower part from FIGS. 30 and 31 in a top view onto the back or underside end face of the housing lower part facing the housing base in the usage position, FIG. 33 shows the housing lower part from FIGS. 30 to 32 in a perspective illustration looking onto the back or underside housing end face of the housing lower part facing the housing base in the usage position, FIG. 34 shows the housing base of the sanitary valve illustrated in FIGS. 22 to 29 in a top view onto the front end face of the housing base facing the housing lower part in the usage position, FIG. 35 shows the housing base from FIG. 34 in a perspective illustration looking onto the end face of the housing base facing the housing lower part in the usage position, FIG. 36 shows the housing base from FIGS. 34 and 35 in a top view onto the back or underside end face of the housing base, FIG. 37 shows the housing base from FIGS. 34 to 36 in a perspective illustration looking onto the back or underside end face of the housing base, FIG. 38 shows the sanitary valve from FIGS. 22 to 29 looking onto the back or underside end face of the sanitary valve, wherein the valve inlet is here shown in a position of medium through-flow, and FIG. 39 shows the sanitary valve from FIGS. 22 to 29 and 38 in a rotated position of its outer and inner housing, in which rotated position the valve inlet of the sanitary valve assumes a position with smaller through-flow, and FIG. 40 shows the sanitary valve from FIGS. 22 to 29, and 38 to 39 in a top view onto the back or underside end face of the sanitary valve, wherein the valve inlet is in its open position, in which open position the valve inlet allows the maximum through-flow.

DETAILED DESCRIPTION

FIGS. 1 to 21, and 22 to 40, show a sanitary valve in two embodiments 1, 201. The sanitary valve 1, 201—which for example may be integrated in the fitting body of a sanitary fitting, not shown in more detail—has an inner housing 2, 202 which is mounted rotatably in an outer housing 3, 203. In the housing interior of the inner housing 2, 202, a main valve 4, 204 is provided which has a movable diaphragm 5, 205 which can be moved between a closed position (shown in FIGS. 8 and 9 or 27) in which the diaphragm 5, 205 lies tightly on a valve seat 6, 206 of the main valve 4, 204, and at least one open position (shown in FIGS. 7 and 26) in which the diaphragm 5, 205 is spaced from the valve seat 6, 206.

By means of the main valve 4, 204, the fluid outlet from the sanitary valve 1, 201 can be optionally or alternately opened or closed. The inner housing 2, 202, mounted rotatably about a rotational axis L in the outer housing 3, 203, has a first valve opening 7, 207 which is connected fluid-conductively to a first valve opening 8, 208 in the outer housing 3, 203 to form a valve outlet of the sanitary valve 1, 201, wherein this pair of first valve openings 7, 8; 207, 208 is arranged at least with its mutually adjacent opening portions in the rotational axis L. The inner housing 2, 202 also has at least one second valve opening 9, 209 which is arranged lying on the outside relative to the valve outlet of the sanitary valve 1, 201, and is paired with at least one second valve opening 10, 11; 210 in the outer housing 3, 203 to form at least one valve inlet 12, 13; 212 of the sanitary valve 1, 201.

In order to be able to regulate the volume flow of the fluid, flowing in via the at least one valve inlet 12, 13; 212, through the sanitary valve 1, 201 per time unit, and/or to be able to mix fluids with different properties e.g. hot or cold water, the respectively paired second valve openings 9, 10, 11; 209, 210 can be brought into congruence by relative twisting of the inner housing 2, 202 and outer housing 3, 203, such that the remaining clear opening cross-section of the at least one valve inlet 12, 13; 212 created by the congruence of the respectively paired second valve openings 9, 10, 11; 209, 210 is variable. The inner housing 2, 202 of the sanitary valve 1, 201 has a pot-like housing lower part 14, 214 (shown in more detail in FIGS. 10 to 13, and 30 to 33) with a pot-base inside from which a valve connector 15, 215 protrudes which connects the first valve opening 7, 207 of the inner housing 2, 202, forming the valve outlet, to the valve seat 6, 206 formed by the free sleeve end region of the valve connector 15, 215. The housing lower part 14, 214 having the valve openings 7, 9; 207, 209 of the inner housing 2, 202 lies fluid-tightly on the outer housing 3, 203 at least in a ring zone of the pot base, lying on the outside relative to the valve openings 7, 9; 207, 209, and/or in a part region of the housing outer periphery of the housing lower part 14, 214. Since the valve connector 15, 215 protrudes into the pot-like housing lower part 14, 214 of the inner housing 2, 202, a fluid chamber 16, 216 is formed between it and the housing inner periphery of the housing lower part 14, 214, which, in the closing and mixing valve shown in FIGS. 1 to 21, may also serve as the mixing chamber.

By means of the main valve 4, 204 provided in the sanitary valves 1, 201 shown here, the water outlet can be moved between an open position and a closed position. In addition, by relative twisting of the inner housing 2, 202 and outer housing 3, 203, the water volume flowing out of the sanitary valve 1, 201 can also be regulated, or the fluids flowing in from at least two supply lines can be mixed in the housing lower part 14, 214 of the inner housing 2, 202, wherein the sanitary valve 1, 201 shown here is also distinguished by a compact structure and comparatively short installation length. The outer housing 3, 203 of the sanitary valve 1, 201 shown in FIGS. 1 to 21 and 22 to 40, has a disc-like or plate-like housing base 17, 217, on which the housing lower part 14, 214 of the inner housing 2, 202 lies fluid-tightly and rotatably, at least with its outer ring and/or circumferential zone. The housing lower part 14, 214 of the inner housing 2, 202, and the housing base 17, 217 of the outer housing 3, 203 are made of ceramic.

A comparison of FIGS. 10 to 13 or 14 to 19 on one side, and FIGS. 30 to 33 and 34 to 37 on the other, shows that the first valve openings 7, 8; 207, 208 of the outer housing 3, 203 and inner housing 2, 202, at least in their mutually adjacent regions, have a circular round and congruent opening cross-section. In the sanitary valve 1 shown in FIGS. 1 to 21 and configured as a closing and mixing valve, the second valve opening 9 in the inner housing 2 is paired with at least two second valve openings 10, 11 in the outer housing 3, such that by relative twisting of the inner housing 2 and outer housing 3 about the rotational axis L, the clear opening cross-section between the second valve opening 9 in the inner housing 2 and at least one valve opening 10 or 11 of the second valve openings 10, 11 provided in the outer housing 3 is reducible and enlargeable relative to at least one valve opening 11 or 10 of the other second valve openings 11, 10 provided in the outer housing, and vice versa. The second valve openings 10, 11 in the outer housing 3 and in particular in its housing base 17 can be connected to different fluid supplies, for example for hot and cold water.

In the sanitary valve 1 shown in FIGS. 1 to 21, the annular space 16 provided between the valve connector 15 and the housing inner periphery of the housing lower part 14 forms a mixing chamber into which the valve inlets 12, 13 open.

The sanitary valve 201 shown in FIGS. 22 to 40 is here configured as a closing and regulating valve, by means of which the water quantity flowing per time unit can be regulated. For this, the sanitary valve 201 in its housing lower part 214 has a first valve opening 207 which cooperates with only one first valve opening 208 in the housing base 217 of the outer housing 203, such that by a relative twist of the inner housing 202 and outer housing 203, the water quantity flowing through per time unit can be regulated.

The mixing or regulating function provided in the sanitary valves 1, 201 is separate from the closing function of said sanitary valves 1, 201. The sanitary valves 1, 201 in their inner housing 2, 202 have a pilot valve 19, 219 via which the main valve 4, 204 can be actuated between the open position and the closed position. The position of the diaphragm 5, 205 can be predefined by the position of a valve lifter 20, 220 which is connected to a push-push mechanism 21, 221 via which the valve lifter 20, 220 can be switched between a switch position corresponding to the open position and a switch position corresponding to the closed position of the sanitary valve 1, 201. This push-push mechanism 21, 221 may be configured as a turning/latching or also as a ball-point-pen mechanism, and here allows adjustment of the valve lifter 20, 220 between the open position and the closed position of the main valve 4, 204 by simple manual pressing or button actuation. By means of this push-push mechanism 21, 221, the valve lifter 20, 220 can be switched between the switch position corresponding to the open position of the main valve 4, 204 and the switch position corresponding to the closed position.

As clear in particular from the longitudinal sections in FIGS. 7 to 9 and 28 to 29, the main valve 4, 204 of the sanitary valves 1, 201 comprises a movable diaphragm 5, 205 which consists of an elastic material and carries a valve body 23, 223 of the main valve 4, 204. The diaphragm 5, 205 can be actuated by the pilot valve 19, 219. For this, the pilot valve 19, 219 has the longitudinally displaceable valve lifter 20, 220, the position of which along its adjustment travel predefines the respective position of the valve body 23, 223 and hence the diaphragm 5, 205.

On the outside of the push-push mechanism 21, 221, a push-button 24, 224 is formed, via which, by repeated pressing, the push-push mechanism 21, 221 can be switched between different switch positions and in particular between the open position and the closed position of the main valve 4, 204. The push-push mechanism 21, 221 is in active or control connection with the valve lifter 20, 220. The push-push mechanism 21, 221 has at least two switching states, corresponding to the open and closed positions, between which the valve lifter 20, 220 can be switched because of the active connection.

FIGS. 8 and 9 or 29 show a lower or outer switch position in which the main valve 4, 204 of the sanitary valve 1, 201 is closed and is therefore in its closed position. FIGS. 7 and 28 show an upper or further outer switch position, in which the main valve 4, 204 is completely open and hence in its open position. The pilot valve 19, 219 has a pressure-relief opening 25, 225 which is formed on the valve body 23, 223 and hence on the movable diaphragm 5, 205. When this pressure-relief opening 25, 225 is closed, a pressure builds up which presses the diaphragm 5, 205 with the valve body 23, 223 into the valve seat 6, 206 of the main valve 4, 204. The main valve 4, 204 is then in its closed position.

When the pressure-relief opening 25, 225 is open, said pressure diminishes so that the diaphragm 5, 205 with valve body 23, 223 lifts away from the valve seat 6, 206. The main valve 4, 204 is thus opened. Accordingly, FIGS. 7 to 9 and 28 to 29 show different positions of the valve lifter 20, 220 which each form a switch position of the at least two switch positions of the main valve 4, 204 which can be predefined by the push-push mechanism 21, 221.

The main valve 4, 204 has the valve seat 6, 206 which can be tightly closed by the valve body 23, 223 and the diaphragm 5, 205. The valve seat 6, 206 is arranged in the through-flow direction between the valve inlets 12, 13 of the sanitary valve 1, or between the valve inlet 212 of the sanitary valve 201 and the valve outlet. The main valve 4, 204 therefore serves for separating the valve inlets 12, 13 or the valve inlet 212 and valve outlets of the main valve 4, 204.

The diaphragm 5, 205 closes a pressure chamber 26, 226 which can be filled via the valve inlets 12, 13; 212 by means of a filling opening in the diaphragm 5, 205 (not shown here in more detail). This filling opening is always open. This achieves that the diaphragm 5, 205 with the valve body 23, 223 arranged thereon, when the pressure chamber 26, 226 is filled, in the closed position shown in FIGS. 8 and 29, closes the valve seat 6, 206, and when the pressure chamber 26, 226 is pressure-relieved, in the open position shown in FIGS. 7 and 9 and 28, opens the valve seat 6, 206.

As already stated, the pressure-relief opening 25, 225 can be closed and opened by the valve lifter 20, 220. Since the pressure-relief opening 25, 225 opens into the valve outlet, opening of the pressure-relief opening 25, 225 leads to the above-mentioned pressure fall in the pressure chamber 26, 226 and hence to an opening of the main valve 4, 204. The pressure-relief opening 25, 225 is here dimensioned larger than the above-mentioned filling opening.

The valve lifter 20, 220 is coupled to the push-push mechanism 21, 221 via a control element 27, 227 in order to assume the above-described switch positions. The control element 27, 227 is tightly inserted into the pressure chamber 26, 226 from the outside. In the active connection between the pilot valve 19, 219 and the push-push mechanism 21, 221, a compensation device is also formed which allows actuation of the push-push mechanism 21, 221 even when the pilot valve 19, 219 is closed and cannot move further against the valve seat 6, 206.

In the component illustrations in FIGS. 20, 21 and 26, 27, it is clear that the main valve 4, 204 also has a cleaning element 28, 228 which is configured to be spring-elastic and has a pin-like free end 29, 229 which passes through the filling opening in the diaphragm 5, 205 (not shown further here) and keeps this clear. The fixed end of the cleaning element 28, 228 is arranged fixedly in the inner housing 2, 202.

It is clear from FIGS. 10 to 13 that the second valve opening provided in the housing lower part of the inner housing 2 is formed as an arcuate slot. As evident from FIGS. 15 to 19, the second valve openings 10, 11 of the outer housing 3, paired with the second valve opening 9 of the inner housing 2 provided in the housing lower part 14, are also formed as arcuate slots in their region facing the housing lower part 14, wherein the valve openings 10, 11 in the housing base 17 have a shorter arcuate portion than the valve opening 9 in the housing lower part 14. By relative twisting of the inner and outer housings 2, 3, the clear opening cross-section between the second valve opening 9 in the inner housing 2 and at least one valve opening 10 or 11 of the second valve openings provided in the outer housing 3 can now be reduced, and at the same time the clear opening cross-section of the second valve opening 9 in the inner housing 2 can be enlarged relative to the other second valve opening 11 or 10 provided in the outer housing 3, and vice versa.

As clear from FIGS. 38 to 40, the clear opening cross-section of the valve inlet in the sanitary valve 201 can be enlarged or reduced as required according to the rotational position of the inner housing 202, rotatable relative to the outer housing 203, such that the through-flow through the sanitary valve 201 is increased or reduced.

The inner housing 2, 202 of the sanitary valves 1, 201 protrudes with a guide portion 30, 230 over the outer housing 3, 203. The push-button 24, 224, in control connection or active connection with the valve lifter 20, 220, is guided displaceably in this guide portion 30, 230 of the housing 2, 202. The guide portion 30, 230 of the inner housing 2, 202 is connected to the housing lower part 14, 214 and here configured as a rotatable actuating element for relative twisting of the outer housing 3, 203 and inner housing 2, 202. The outer housing 3, 203 surrounds the inner housing 2, 202 with the exception of the valve inlets and outlets and the guide portion 30, 230.

In the sanitary valve 201 shown in FIGS. 1 to 21, a stop sleeve 31 is placed on the guide portion 30. This stop sleeve 31 has a counter-profiling on its sleeve inner periphery, which is held rotationally fixedly on a profiling on the outer periphery of the guide portion 30. The stop sleeve 31 has peg-like rotational stops 32 protruding in the direction of the outer housing 3, which cooperate with counter-stops 33 on the outer housing 3. These rotary stops 32 and counter-stops 33 provided on the stop sleeve 31 and outer housing 3 allow the temperature of the mixed water flowing out of the sanitary valve 1 to be established in a predefined temperature range.

In the perspective component illustrations in FIGS. 20, 21 and 26, 27, a sleeve-like housing upper part 34, 234 of the outer housing 3, 203 of the valve 1, 201 can be seen, which housing upper part 34, 234 has central passage openings 35, 235 for the guide portion 30, 230 of the inner housing 2, 202. Below the guide portion 30, 230, the push button 24, 224 can be seen on which in some cases a cap (not shown further here) can be releasably latched or otherwise positioned. A rotary cap 36, 236 of the push-push mechanism 21, 221 can be inserted in the sleeve-like push-button 24, 224, and the control element 27, 227 of the valve lifter 20, 220 protrudes into said rotary cap 36, 236. On the periphery of the rod-like control element 27, 227, a groove is provided into which a clip 37, 237 can be inserted which connects the valve lifter 20, 227 and its control element 27, 227 captively but displaceably to the rotary cap 36, 236. A return element 39, 239 configured as a compression spring acts on the rotary cap 36, 236 and a bush 38, 238 pressed therein. The housing upper part of the inner housing 2, 202 is here configured in two pieces and has an outer part 40, 240 carrying the guide portion 30, 230, in which an inner part 41, 241 is inserted. The control element 27, 227 of the valve lifter 20, 220 is guided in a central guide opening in the inner part 41, 241, wherein the control element 27, 227 is sealed in the guide opening by a sealing ring 42, 242. In the inner part 41, 241, the valve lifter 20, 220 is pressed in the direction towards the diaphragm 5, 205 by means of a coil compression spring 43, 243. So that the valve lifter 20, 220 can tightly close the pressure-relief opening 25, 225, it has a sealing cap 44, 244 on its lifter end facing the diaphragm 5, 205. The cleaning element 28, 228, configured as a compression spring, inside the housing lower part 14, 214 is shown with its end 29, 229 protruding into the ventilation opening (not shown) in the diaphragm 5, 205. The outer part 40, 240 of the inner housing 2, 202 has the guide portion 30, 230 which, on its cylindrical outer periphery, has the profiling formed by longitudinal grooves, on which profiled guide portion 30, 230 a sleeve-like cap (not shown further here) may be placed if required. Inside the outer part 3, 203, the valve body 23, 223 can be seen which latches or is similarly connected to a central fixing opening of the diaphragm 5, 205.

As evident from the longitudinal sections in FIGS. 7 to 9 and 28 to 29, the diaphragm 5, 205 is clamped between the housing lower part 14, 214 of the inner housing 2, 202 and its inner part 41, 241, wherein the diaphragm 5, 205 seals these components 14, 41; 214, 241 (made of different materials) of the sanitary valves 1, 201 against one another. Sealing rings 45, 46, 47; 245, 246 are provided on the outside of the sanitary valves 1, 201 and seal the sanitary valve installed in the fitting body of a sanitary fitting in the region of a ring shoulder, serving as an insert stop, on the housing outer periphery or in the region of the valve inlet 12, 13; 212. Rotation-prevention protrusions 48, 248 protrude on the housing base 17; 217 and engage in corresponding holes in the fitting body to secure the sanitary valve 1, 201 against accidental twisting of the sanitary valve 1, 201 itself during rotation on the guide portion 30, 230.

LIST OF REFERENCE SIGNS

1 Sanitary valve (according to FIGS. 1-21)
2 Inner housing

3 Outer housing
4 Main valve
Diaphragm
6 Valve seat
7 First valve opening in inner housing 2
8 First valve opening in outer housing 3
9 Second valve opening in inner housing 2
10 Second valve opening in outer housing 3
11 Second valve opening in outer housing 3
12 Valve inlet
13 Valve inlet
14 Valve lower part
15 Valve connector
16 Fluid chamber
17 Housing base
19 Pilot valve
20 Valve lifter
21 Push-push mechanism
23 Valve body
24 Push-button
25 Pressure-relief opening
26 Pressure chamber
27 Control element
28 Cleaning element
29 Free end of cleaning element 28
30 Guide portion
31 Stop sleeve
32 Rotary stops
33 Counter-stops
34 Housing upper part
35 Central passage opening
36 Rotary cap
37 Clip
38 Bush
39 Return element
40 Outer part
41 Inner part
42 Sealing ring
43 Coil compression spring
44 Sealing cap
45 Sealing ring
46 Sealing ring
47 Sealing ring
48 Rotation-prevention protrusion
201 Sanitary valve (according to FIGS. 22 to 40)
202 Inner housing
203 Outer housing
204 Main valve
205 Diaphragm
206 Valve seat
207 First valve opening in inner housing 202
208 First valve opening in outer housing 203
209 Second valve opening in inner housing 202
210 Second valve opening in outer housing 203
212 Valve inlet
214 Valve lower part
215 Valve connector
216 Fluid chamber
217 Housing base
219 Pilot valve
220 Valve lifter
221 Push-push mechanism
223 Valve body
224 Push-button
225 Pressure-relief opening
226 Pressure chamber
227 Control element 228 Cleaning element
229 Free end of cleaning element 228
230 Guide portion
234 Housing upper part
235 Central passage opening
236 Rotary cap
237 Clip
238 Bush
239 Return element
240 Outer part
241 Inner part
242 Sealing ring
243 Coil compression spring
244 Sealing cap
245 Sealing ring
246 Sealing ring
248 Rotation-prevention protrusion
L Rotational axis

The invention claimed is:

1. A sanitary valve (1, 201) comprising:
a main valve (4, 204) which has a movable diaphragm (5, 205) is movable between a closed position, in which the diaphragm (5, 205) lies tightly against a valve seat (6, 206) of the main valve (4, 204), and at least one open position in which the diaphragm (5, 205) is spaced from the valve seat (6, 206);
an inner housing (2, 204) having an interior in which the main valve (4, 204) is provided,
an outer housing (3, 203) in which the inner housing (2, 202) is mounted so as to be rotatable about a rotational axis (L);
the inner housing (2, 202) is equipped with a first valve opening (7, 207) which is fluid-conductively connected to a first valve opening (8, 208) in the outer housing (3, 203) in order to form a valve outlet of the sanitary valve (1, 201), which pair of said first valve openings (7, 8; 207, 208) is arranged on the rotational axis (L);
the inner housing (2, 202) has at least one second valve opening (9, 209) which is arranged on an outside relative to the valve outlet and is paired with at least one second valve opening (10, 11; 210) in the outer housing (3, 203) in order to form at least one valve inlet (12, 13; 212) of the sanitary valve (1, 201);
the respectively paired ones of the second valve openings (9, 10, 11; 209, 210) movable into congruence by a relative twisting of the inner housing and the outer housing (2, 3; 202, 203) such that a remaining clear opening cross-section of the at least one valve inlet (12, 13; 212) created by the congruence of the respectively paired ones of the second valve openings (9, 10, 11; 209, 210) is variable;
the inner housing (2, 202) has a pot-shaped housing lower part (14, 214), with a pot-base inside from which a valve connector (15, 215) protrudes which connects the first valve opening (7, 207) of the inner housing (2, 202) forming the valve outlet to the valve seat (6, 206) which is formed by a free sleeve end region of the valve connector (15, 215); and
the housing lower part (14, 214) having the valve openings (7, 9; 207, 209) of the inner housing (2, 202) thereby lies fluid-tightly on the outer housing (3, 203), at least in a ring zone of the pot base on an outside relative to the valve openings (7, 8, 9, 10, 11; 207, 208, 209, 210).

2. The sanitary valve as claimed in claim 1, wherein the outer housing (3, 203) has a disc-like or plate-like housing base (17, 217) on which the housing lower part (14, 214) of the inner housing (2, 202) lies fluid-tightly and rotatably at least in one of an outer ring or circumferential zone thereof.

3. The sanitary valve as claimed in claim 1, wherein at least one of the housing lower part (14, 214) of the inner housing (2, 202) or a housing base (17, 217) of the outer housing (3, 203) is made of ceramic.

4. The sanitary valve as claimed in claim 1, wherein the first valve openings (7, 8; 207, 208) of the outer housing (3, 203) and inner housing (2, 202) have at least one of circular round or congruent opening cross-sections at least in their mutually adjacent regions.

5. The sanitary valve as claimed in claim 1, wherein the second valve opening (9; 209) in the inner housing (2, 202), which is connected fluid-conductively to at least one second valve opening (10, 11; 210) in the outer housing (3, 203), is formed as a sickle-shaped or arcuate slot.

6. The sanitary valve as claimed in claim 1, wherein the sanitary valve comprises a closing and mixing valve (1) or as a closing and regulating valve (201).

7. The sanitary valve as claimed in claim 1, wherein the second valve opening (9) in the inner housing (2) is paired with at least two of the second valve openings (10, 11) in the outer housing (3), such that by relative twisting of the inner housing (2) and the outer housing (3), the clear opening cross-section between the second valve opening (9) in the inner housing (2) and at least one said valve opening (10; 11) of the second valve openings (10, 11) provided in the outer housing (3) is reducible and enlargeable relative to at least one other said valve opening (11; 12) of the second valve openings (10, 11) provided in the outer housing (3), and vice versa.

8. The sanitary valve as claimed in claim 7, wherein the second valve openings (10, 11) provided in the outer housing (3) are connectable to different fluid supplies.

9. The sanitary valve as claimed in claim 1, wherein an annular space provided between the valve connector (15) and a housing inner periphery of the housing lower part (14) forms a mixing chamber.

10. The sanitary valve as claimed in claim 1, wherein the housing lower part (14, 214) is connected to a housing upper part of the inner housing (2, 202); the diaphragm (5, 205) is clamped in a clamping zone between the housing lower part (14, 214) and the housing upper part of the inner housing (2, 202); and the diaphragm (5, 205) seals between the housing lower part (14, 214) and the housing upper part of the inner housing (2, 202).

11. The sanitary valve as claimed in claim 10, wherein at least one of a) the housing lower part (14, 214) and the housing upper part of the inner housing (2, 202) are made of different materials, or b) the housing upper part of the inner housing (2, 202) is made of plastic.

12. The sanitary valve as claimed in claim 11, further comprising a pilot valve (19, 219) in the inner housing (2, 202) via which the main valve (4, 404) is actuatable between the open position and the closed position; and a position of the diaphragm (5, 205) is predefinable by a position of a valve lifter (20, 220) connected to a push-push mechanism, (21, 221), by which the valve lifter (20, 220) is switchable between a switch position corresponding to the open position and a switch position corresponding to the closed position of the sanitary valve (1, 201).

13. The sanitary valve as claimed in claim 12, wherein a guide portion (30, 230) of the inner housing (2, 202) protrudes over the outer housing (3, 203), and a push-button (24, 224) in at least one of control or active connection with the valve lifter (20, 220) is displaceably guided in said guide portion (30, 230) of the inner housing (2, 202).

14. The sanitary valve as claimed in claim 13, wherein the guide portion (30, 230) of the inner housing (2, 202) is rotationally fixedly connected to at least one of the housing lower part (14, 214) or housing upper part, and configured as a rotatable actuating element for relative twisting of the inner housing (2, 202) and the outer housing (3, 203).

15. The sanitary valve as claimed in claim 12, wherein a pressure-relief opening (25, 225), which opens into the at least one valve outlet, on the diaphragm or a valve body (23, 223) of the diaphragm (5, 205), is closeable by the valve lifter (20, 220).

16. The sanitary valve as claimed in claim 11, wherein the free sleeve end region of the valve connector formed as the valve seat (6, 206) is arranged at a distance below a separating plane arranged between the housing lower part (14, 214) and the housing upper part of the inner housing (2, 202).

17. The sanitary valve as claimed in claim 1, wherein the valve seat (6, 206), which is closeable by the diaphragm (5, 205), is arranged between the valve outlet and the at least one valve inlet (12, 13; 213), the diaphragm (5, 205) closes a pressure chamber (26, 226) which is fillable via the at least one valve inlet (12, 13; 213) so that the diaphragm, when the pressure chamber (26, 226) is filled, in a closed position closes the valve seat (6, 206) and when the pressure chamber (26, 226) is pressure-relieved, in an open position opens the valve seat (6, 206).

\* \* \* \* \*